Aug. 11, 1936.　　　　N. A. LOPEZ　　　　2,050,709
PORTABLE DRILL
Filed Dec. 24, 1934　　　2 Sheets-Sheet 1
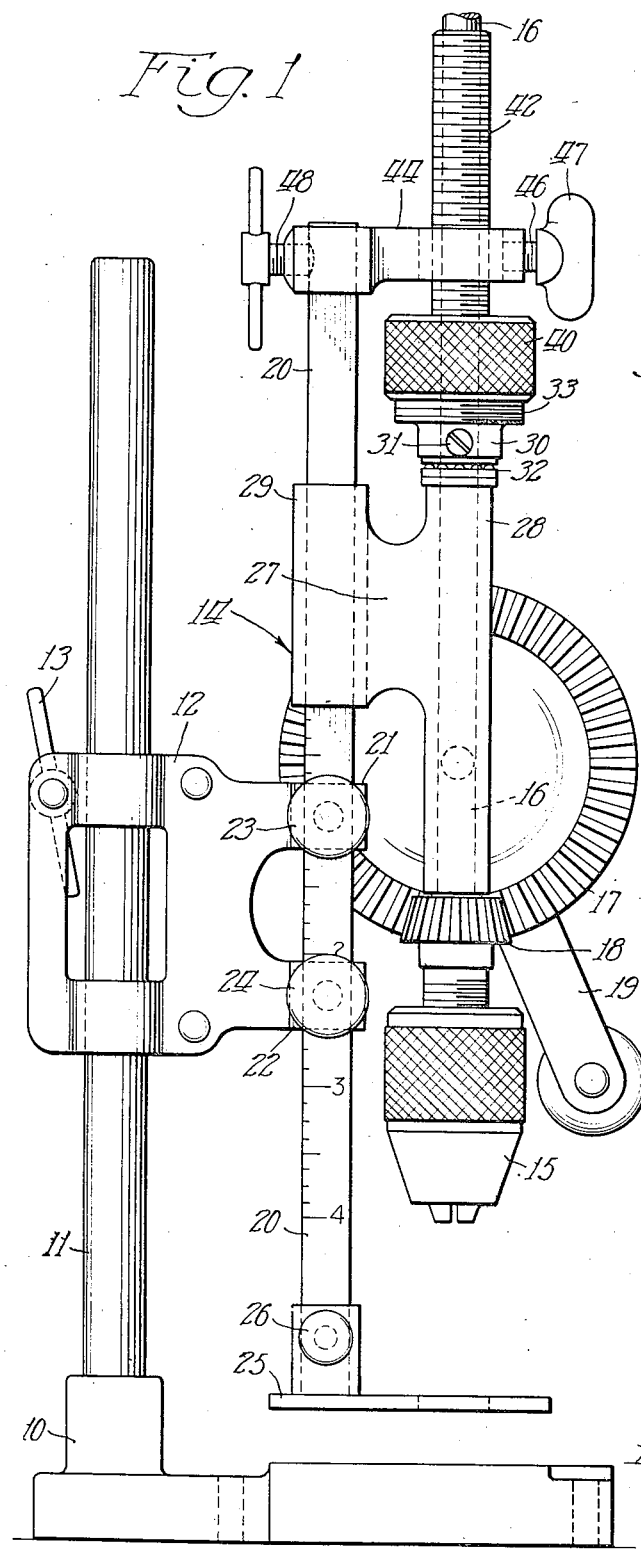
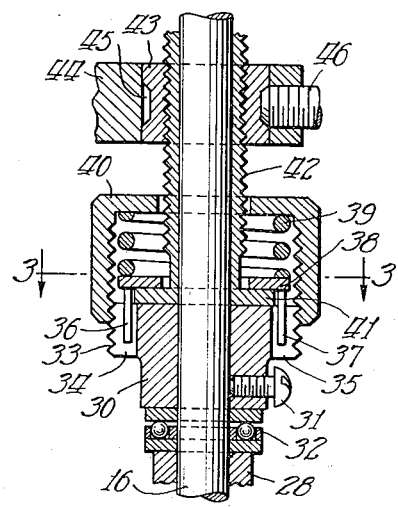
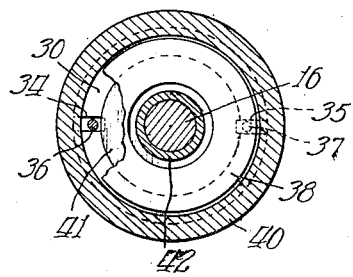
Inventor
Nicolas A. Lopez Aug. 11, 1936.     N. A. LOPEZ     2,050,709
PORTABLE DRILL
Filed Dec. 24, 1934     2 Sheets-Sheet 2
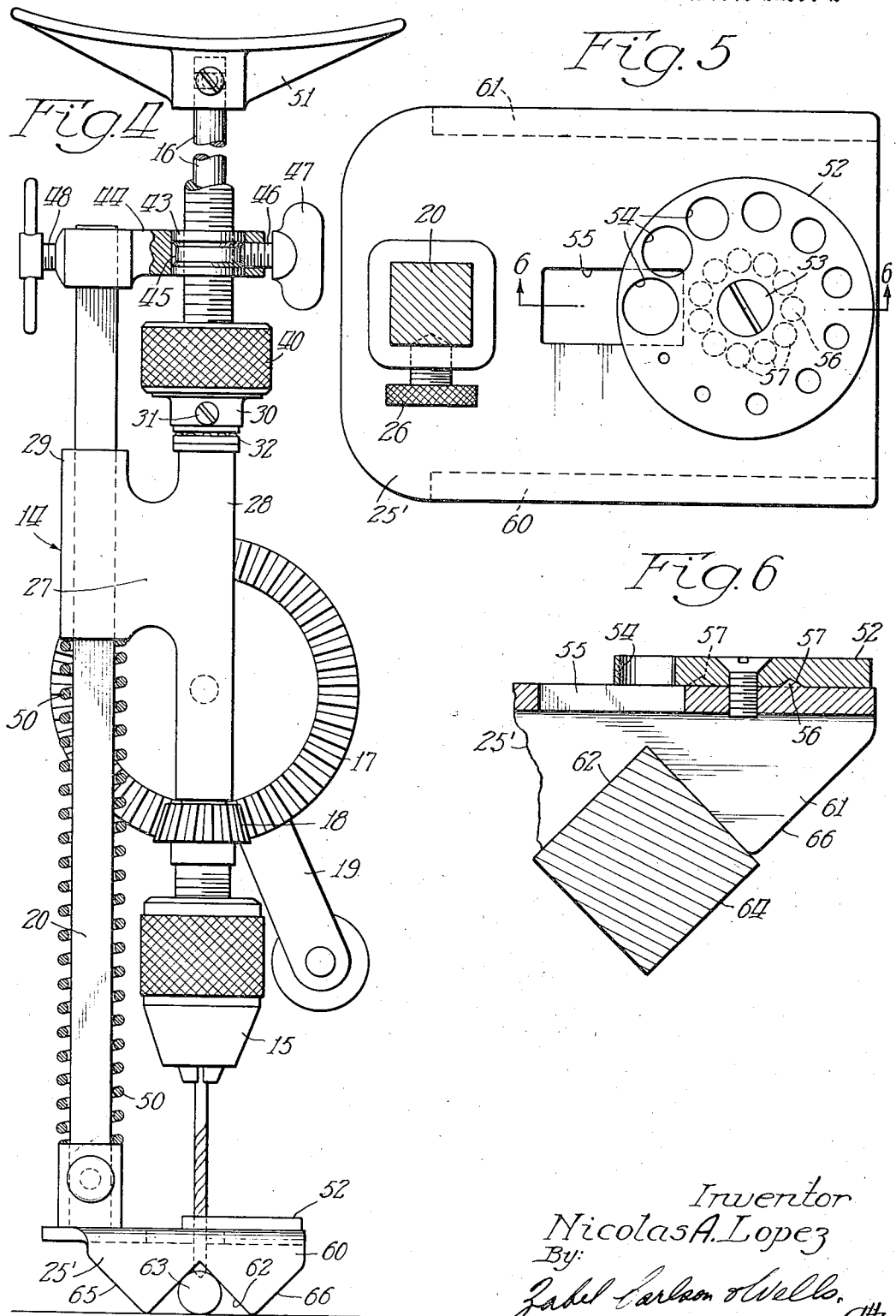
Inventor
Nicolas A. Lopez
By:
Zabel Carlson & Wells.
Attys.

Patented Aug. 11, 1936

2,050,709

UNITED STATES PATENT OFFICE 2,050,709

PORTABLE DRILL

Nicolás A. Lopez, Chicago, Ill.

Application December 24, 1934, Serial No. 759,063

5 Claims. (Cl. 77—7)

My invention relates to drills and more particularly to a combination portable drill and bench drill having cooperating parts whereby the drill may be readily utilized either as a bench drill or a portable drill.

My invention contemplates further the provision of a novel means in a drill of this character for automatically advancing or feeding the drill to the work.

My invention contemplates further the provision of a novel means for guiding the drill to avoid danger of breaking it.

My invention contemplates further the provision of a novel means to prevent tipping of the drill with respect to the work and to adapt the drill to bore materials of other shapes than flat, such for example as round rod or pieces having the two sides at right angles where it is desired to bore the hole diagonally with respect to the two sides and other shapes.

Other and more specific features and advantages of the invention will appear as the description proceeds in connection with the accompanying drawings. It is to be understood, however, that the drawings and description are illustrative only and are not to be taken as limiting the invention except in so far as it is limited by the claims.

In the drawings—

Fig. 1 is a side elevation of the drill employed as a bench drill;

Fig. 2 is an enlarged sectional view of the drill feeding mechanism;

Fig. 3 is a sectional view on the line 3—3 of Fig. 2;

Fig. 4 is a side elevation partly in section showing the drill used as a portable drill;

Fig. 5 is an enlarged plan view of the work holding and drill guiding mechanism; and Fig. 6 is an enlarged section taken on the line 6—6 of Fig. 5.

Referring now in detail to the drawings, the drill as shown in Fig. 1 comprises a base 10, a standard 11, a clamp 12 vertically adjustable upon the standard 11 by means of the clamping nut 13, and the drill mechanism proper which I shall refer to by the numeral 14. This drill mechanism proper embodies a chuck 15 for receiving the drill, a drive shaft 16 for driving the chuck, an operating mechanism for the drive shaft consisting of the gear 17, pinion 18, and crank 19 on the gear 17.

I have shown this as a hand operated mechanism although it is obvious that the gear 17 may be power rotated in a well known manner if desired.

The mechanism just described is supported on the standard 11 by means of the bar 20 which is vertically slidable in the upper and lower guide members 21 and 22 of the bracket 12 and may be locked in place by means of the set screws 23 and 24. The bar 20 may be suitably marked as indicated for measuring the distance above the base 10 if desired. This bar carries at its lower end a detachable foot piece or work holder 25 which is secured by means of the set screw 26.

I have shown in Figs. 1 and 4 two different forms of work holding devices although it is obvious that either one may be employed if desired.

The drill shaft is mounted for vertical movement on the bar 20 by means of the bracket member 27 which has the elongated bearing portion 28 for the shaft 16, and also the less elongated bearing portion 29 on the bar 20. In the present instance, I have shown the bar 20 as being rectangular in cross section so that the member 27 cannot rotate thereon although it is obvious that the bar may be of other shapes, and any well known means may be used to prevent rotation of the bracket 27 thereon.

The shaft 16 has the collar 30 secured thereto by means of the set screw 31, and a suitable ball bearing indicated at 32 is inserted between the collar 30 and the top of the bracket 27. Collar 30 serves the dual purpose of supporting the shaft 16 on the portion 28 of the bracket 27 in certain instances, and of forming a part of the clutch mechanism for feeding the drill to the work when the automatic feed mechanism described hereinafter is used. It will be noted that the collar 30 at its upper end is screw threaded as indicated at 33 and is slotted at 34 and 35 to receive the pins 36 and 37.

These pins are carried upon a disk 38 which is pressed downwardly by means of a spring 39 when the cap 40 is screwed down upon the collar 30. Interposed between the disk 38 and the top surface of the collar 30 is the flange 41 on the lower end of the feed screw 42. Feed screw 42 is rotatable on the shaft 16 and slidable lengthwise thereon except for the connections made through the flange 41, disk 38, and collar 30. This feed screw is screw threaded in the sleeve 43 which is releasably mounted in the bracket member 44 by means of the groove 45 and the set screw 46 which has a wing head as indicated at 47. The bracket member 44 is secured upon the bar 20 by means of the set screw 48.

When the feed mechanism is being used, the operation is substantially as follows:

The cap 40 is screwed down upon the collar 30 to apply a certain amount of pressure between the flange 41 and the upper and lower bearing members therefor consisting of the disk 38 and the top surface of the collar 30. Now, upon rotation of the shaft 16 to rotate the drill, the frictional contact between the flange 41 and the members 30 and 38 will tend to cause rotation of the feed screw 42. The threads of the feed screw 42 are of such direction as to feed the screw downwardly when it is rotated in the direction which causes the drill to cut—that is, in a clockwise direction when one looks down upon the mechanism. The rotation of the drill will, therefore, advance the drill to the work, and, if the resistance of the work to the advance of the drill is not very great, it will continue to rotate the screw 42 without any slippage between the flange 41 and the members 30 and 38. The resistance to advance of the drill may become great enough, however, to cause slippage between the flange 41 and the members 30 and 38 in which case the feed or advancement of the drill will be retarded although the rotation of the drill will continue just the same.

Thus, by regulating the tension or pressure upon the flange 41 by screwing the cap 40 down or up, the operator may set the drill feed to operate at any desired pressure within the range provided by the cap 40 and the spring 39, it being obvious that the greater the pressure applied through the spring 39 to the flange 41, the more resistance it will require to cause slippage between the feed screw 42 and its flange 41 on the one hand, and the shaft 16 with its associated members 30 and 38 on the other hand.

Should it be desired not to use the feeding mechanism at all, this mechanism may be completely released by backing up the set screw 47 to release the sleeve 43 within the bracket 44.

In operating drills of this character, it is often necessary to take the drill to the work rather than to bring the work to the bench. In this case, this is accomplished by removing the bracket 12 from the bar 20 simply by loosening the screws 23 and 24 and sliding the bar out, the work holder 25 being removed for this purpose. When the drill is used thus, as a portable drill, the work holder 25 or the work holder 25' shown in Fig. 4 may be attached directly to the work or merely pressed down upon the work as desired. It may be attached for example by use of a suitable strap or clamp of any well known character.

When used as a portable drill, I prefer to provide on the bar 20, between the work holder and the bracket 27, a rather heavy spring 50 which tends to oppose the advance of the drill with respect to the work thus making it necessary to exert upon the breast plate 51 a considerably greater pressure than is necessary for the advancement of the drill. The reason for this spring 50 is to thus provide a means for applying enough pressure to the work holder plate 25 or 25' to prevent its wobbling or getting out of line due to the force applied to the crank 19 in turning the drill. This helps to hold the drill straight and prevents bending or breaking drills.

The feeding mechanism may or may not be used depending upon whether or not the work holder is clamped directly down to the work. If the feeding mechanism is not to be used, then the set screw 46 is released so as to permit the sleeve 43 to move up and down through the bracket 44.

When using the smaller sized drills, I find considerable difficulty is encountered due to the drills not being guided close enough to the tip end when they are started into the work. This is particularly true when one is drilling a rounded shaft or when drilling for example into the corner of a piece of angle iron.

In order to overcome this difficulty, I provide in conjunction with the work holding plate 25 and 25' a drill guide which can be made to fit snugly upon the drill and thus guided very close to the point where it engages the work. This drill guide consists of a plate or disk 52 which is secured by means of the screw 53 directly on top of the plate 25 or 25' and which is provided with a series of openings indicated at 54 arranged about the center of the plate 52 with their centers at the same distance from the center of the plate 52, or in other words upon a common circle about the center of the screw 53. These openings 54 are graduated in size from relatively large openings down to very small ones to accommodate the different sized drills.

It is evident from an inspection of Fig. 5 that a considerable number of drill sizes can be thus provided in a single plate.

The openings in the plate 52 may, any one of them, be positioned accurately over the opening at 55 in the work plates 25 and 25' so that, when the drill is advanced, it will be guided by the proper size opening in the plate 52 which lies very close to the work.

Plate 52 is positioned and held in position by the little projection 56 which is diametrically opposite the drill axis extended through the opening 55. That is to say, the tip of the projection 56 is on a straight line drawn through the drill axis and the axis of the screw 53. In the disk or plate 52, there is provided a series of recesses 57 each one of which is arranged diametrically opposite one of the openings 54, these recesses 57 being equally spaced from the center of the screw 53 as shown in Fig. 5.

It is believed to be evident, therefore, that when the desired opening 54 is placed over the opening 55 in the plate 25, one of the recesses 57 will be fitted over the pin 56, and the plate 52 can thus be locked firmly in position so as to serve as a rigid guide guiding the lower end of the drill as it advances upon the work.

The particular work holder 25' is provided, as shown, with the downturned side portions at 60 and 61, which side portions are notched as indicated at 62 to provide two faces at right angles to each other which join in a plane drawn through the drill axis. The reason for these side pieces may be illustrated by the round shaft shown at 63 in Fig. 4 as they serve to hold the shaft and prevent its rolling. It is obvious that they may also be used to hold the drill on a corner of an angular piece such as is indicated at 64 in Fig. 6. If one is drilling into the corner where the sides advance toward the drill at right angles to each other, then the outer edges 65 and 66 (see Fig. 4) may engage the two side walls to properly position the drill with respect to the work.

From the above description, it is believed that the construction and operation of this device will be clear to those skilled in this art and the advantages thereof readily apparent.

Having thus described one specific form of my invention, what I claim as new and desire to secure by Letters Patent is:

1. A portable drill having a drill chuck, a drive shaft therefor, means for rotating said shaft, a feed screw comprising a sleeve loose on said drive shaft, a drill support having means into which said feed screw is threaded, a friction clutch carried by said screw and connecting the shaft to the screw adapted upon rotation of said shaft to turn said screw, a guide bracket vertically movable on the support and carrying said first named means on said drive shaft, a work engaging member fixed to the base of said support and adapted to be pressed against the work, and a relatively strong spring interposed between said bracket and said work engaging member to oppose advance of the drill.

2. A portable drill having a drill chuck, a drive shaft therefor, means for rotating said shaft, a feed screw comprising a sleeve loose on said drive shaft, a drill support having means into which said feed screw is threaded, a friction clutch carried by said screw and connecting the shaft to the screw adapted upon rotation of said shaft to turn said screw, said clutch comprising a flange on the feed screw, a collar on the shaft having a top surface engaging said flange, a disk engaging said flange on the side opposite the collar, and nonrotatably connected to the collar, and means to vary the pressure of said collar and disk on said flange, comprising a spring engaging said disk, and a cap over said spring screw threaded on said collar and provided with an opening through which said sleeve extends.

3. A portable drill having a drill chuck, a drive shaft therefor, means for driving said shaft, a supporting bar, a bracket carrying said driving means and vertically movable on said bar, a feed screw comprising a sleeve rotatable on the drive shaft, a friction clutch connecting the feed screw to the shaft, a bracket on the bar having means in which said feed screw is threaded, said second named means being releasable from the bracket to provide free movement of the feed screw in said bracket to provide for rapid retraction of the drill shaft from the work.

4. A portable drill having a drill chuck, a drive shaft therefor, a supporting bar, a bracket carrying said driving means and vertically movable on said bar, spring means on said bar opposing downward movement of the bracket, a work engaging member fixed to the lower end of said bar and extending beneath the drill chuck, said member providing a stop means for the spring means on said bar, said work engaging member having an opening through which a drill held in said chuck may extend, and means providing a guide to prevent bending of the drill between the chuck and work engaging member, said means comprising a plate mounted on said work engaging member and provided with an annular series of openings graduated in size, said plate being movable on the work engaging member to bring any one of said openings into alignment with the axis of the drill chuck, and means for holding said plate in position with one of said openings aligned with the axis of the drill chuck.

5. A portable drill having a drill chuck, a drive shaft therefor, means for driving said shaft, a supporting bar, a bracket carrying said driving means and vertically movable on said bar, a feed screw comprising a sleeve rotatable on the drive shaft, a friction clutch connecting the feed screw to the shaft, a bracket on the bar having means in which said feed screw is threaded, a relatively strong spring interposed between the lower end of the supporting bar and said first named bracket whereby to oppose advance of the drill, said means in which the feed screw is threaded being quickly releasable from its bracket to permit free movement of the feed screw in said bracket whereby the force of said spring may aid in quickly retracting the drill chuck from its work.

NICOLÁS A. LOPEZ.